US011178316B2

(12) United States Patent
Tagaya

(10) Patent No.: US 11,178,316 B2
(45) Date of Patent: Nov. 16, 2021

(54) MONITORING CAMERA HAVING A COMPOUND WINDOW

(71) Applicant: Axis AB, Lund (SE)

(72) Inventor: Akira Tagaya, Tokyo (JP)

(73) Assignee: AXIS AB, Lund (SE)

( * ) Notice: Subject to any disclaimer, the term of this patent is extended or adjusted under 35 U.S.C. 154(b) by 81 days.

(21) Appl. No.: 16/814,127

(22) Filed: Mar. 10, 2020

(65) Prior Publication Data

US 2020/0296260 A1  Sep. 17, 2020

(30) Foreign Application Priority Data

Mar. 14, 2019 (EP) .................................... 19162804

(51) Int. Cl.
| | |
|---|---|
| *H04N 5/225* | (2006.01) |
| *G03B 17/55* | (2021.01) |
| *H04N 7/18* | (2006.01) |
| *G02B 27/00* | (2006.01) |
| *G03B 19/10* | (2021.01) |
| *G03B 39/02* | (2021.01) |

(52) U.S. Cl.
CPC ....... *H04N 5/2252* (2013.01); *G02B 27/0006* (2013.01); *G03B 17/55* (2013.01); *H04N 7/18* (2013.01); *G03B 19/10* (2013.01); *G03B 39/02* (2013.01); *G03B 2215/0517* (2013.01)

(58) Field of Classification Search
None
See application file for complete search history.

(56) References Cited

U.S. PATENT DOCUMENTS

| 5,468,559 A | 11/1995 | Solinov et al. |
| 2012/0170119 A1* | 7/2012 | Chu ....................... G03B 11/00 359/512 |

(Continued)

FOREIGN PATENT DOCUMENTS

| CN | 105744123 A | 7/2016 |
| EP | 0654344 A1 | 5/1995 |

(Continued)

OTHER PUBLICATIONS

Korean Office Action dated Jan. 4, 2021 for Korean Patent Application No. 10-2020-0004831.

(Continued)

*Primary Examiner* — William B Perkey
(74) *Attorney, Agent, or Firm* — Volpe Koenig

(57) ABSTRACT

A monitoring camera having a compound window arranged in a frame of a camera housing, and a camera head arranged inside the housing, is disclosed. The compound window has an inner transparent plate, closest to the camera head, and an outer protective window, arranged in a plane parallel to the transparent plate, on an outside thereof, and the compound window further comprises a heating arrangement arranged and configured to supply thermal energy to peripheral areas of the transparent plate. The transparent plate has a greater heat conductivity than the protective window and is arranged in close proximity to the protective window, so thermal energy will be transferred from the heating arrangement to the transparent plate and then efficiently transferred to the protective window.

13 Claims, 2 Drawing Sheets

(56) References Cited

U.S. PATENT DOCUMENTS

| | | | |
|---|---|---|---|
| 2013/0062228 A1* | 3/2013 | Danilov | ............... B08B 17/02 206/216 |
| 2016/0261829 A1 | 9/2016 | Olsson et al. | |
| 2017/0019571 A1 | 1/2017 | McBride et al. | |
| 2019/0056643 A1 | 2/2019 | Chang | |

FOREIGN PATENT DOCUMENTS

| | | |
|---|---|---|
| EP | 1626583 A1 | 2/2006 |
| KR | 101421993 B1 | 7/2014 |
| KR | 101582193 B1 | 1/2016 |
| KR | 101813157 B1 | 1/2018 |

OTHER PUBLICATIONS

Extended European Search Report dated Sep. 19, 2019 for the European Patent Application No. 19162804.9.

\* cited by examiner

MONITORING CAMERA HAVING A COMPOUND WINDOW

TECHNICAL FIELD

The present invention relates to a window assembly, and in particular an impact resistant window assembly for an outdoor housing of a camera.

BACKGROUND

Monitoring cameras are increasingly popular for commercial as well as personal installations. In the most straightforward application the purpose of the monitoring camera is to identify events taking place within the scene it images, so as to allow for an algorithm or an operator to deduce if something out of the ordinary occurs. The deduction may be performed in real time in a live stream from the monitoring camera, or the deduction could be based on recorded material. Another application may be to have monitoring cameras arranged on and in a vehicle, such as a vehicle for public transportation. In such an application the monitoring cameras may be used to help operators to understand the situation in and around the vehicle, and in the unlucky event that something would happen, recorded video material may be used to clarify what actually did happen.

Regardless of the application, a prerequisite for the usability of the material acquired by a monitoring camera is that the camera view is not obstructed, and for cameras arranged in an outdoor environment this is an issue to account for. Airborne pollutions such as dust may gradually obstruct the view over time but given normal circumstances the effect of these causes may be handled by means of ensuring adequate service intervals. Vandalism, such as if an individual spray paints the camera also results in a rapid deterioration of the view, and in the event of such an activity the camera system may alert an operator so that the issue can be mended. Vandalism may be difficult to account for, yet monitoring cameras, or housings accommodating monitoring cameras may have a constructional protection to withstand at least some amount of vandalism in the form of impacts. A more frequently recurring reason for obstruction is weather. In cold temperatures snow and ice can generate rapid buildup of material that blocks the view of the monitoring camera.

An improved camera window assembly, which may be used for cameras arranged in harsh and cold environments and that may be subject to violent impacts is set forth herein.

SUMMARY

According to a first aspect, a monitoring camera has a compound window arranged in a frame of a camera housing, and a camera head arranged inside the housing, wherein the compound window has an inner transparent plate, closest to the camera head, and an outer protective window, arranged in a plane parallel to the transparent plate, on an outside thereof, wherein the compound window further comprises a heating arrangement arranged and configured to supply thermal energy to peripheral areas of the transparent plate, wherein the transparent plate has a greater heat conductivity than the protective window and is arranged in close proximity to the protective window, so that thermal energy transferred from the heating arrangement to the transparent plate may be efficiently transferred to the protective window. The elevated thermal conductivity of the transparent plate will ensure that the heat applied along the peripheral edges will be distributed throughout the plate, and following that it will be transferred to the protective window.

In one or more embodiments the transparent plate may arranged in a resilient profile, which in turn is arranged in the frame, and wherein a resilience of the resilient profile enables for it to move in relation to the frame, thus providing the same function for the transparent plate.

The protective window may also be arranged in or on the resilient profile, so that a displacement of the protective window is transformed to a biasing force on the resilient profile. Using the resilient profile as a buffer between the protective window and the transparent plate may help to further distribute forces between the two components, and it will also result in that forces may be transferred directly from the protective window to the resilient profile, without reaching the transparent plate at all.

In yet other embodiments the resilient profile may have an area of reduced structural stability located between the transparent plate and the frame, so that any deformation resulting in relative motion between the frame and the resilient profile is focused to this area, enabling for the transparent plate to be forced downwards towards the frame, in the direction of the camera head, without breaking. The resilient profile may of course provide a cushioning effect merely by the inherent properties of the material making it resilient, yet the effect may be enhanced further by means of its geometrical design. Some examples will be given in the detailed description, yet there are of course numerous other ways of obtaining the desired properties. Notably, the effect does not cushion in the sense that it absorbs a force from the protective window before it can be transferred to the transparent plate. Rather, it reduces the transferred impact by allowing for the transparent plate to move away.

In one or more embodiments the heating arrangement may arranged in a recess of the resilient profile, preferably on the far side thereof in relation to the protective window. The recess will position the heating arrangement securely, and the resilience of the resilient profile may assist in achieving a good thermal contact between the heating arrangement and the transparent plate, which is readily understood by observing the illustrations referred to in the detailed description. Furthermore, ensuring that an open end of the recess faces the transparent plate assists in directing the thermal energy towards the transparent plate so that it may be used efficiently.

The resilient profile may also be designed to provide a seal between the components of the compound window, and thereby protecting the monitoring camera from the surrounding environment. Yet, to obtain an even better seal a gasket may be arranged onto the protective window and held in place by a cover plate. By tightening the cover plate towards the frame, or by another constructional component, the gasket will be compressed and provide a seal. In a related embodiment the gasket is arranged in the frame, so that compression of the gasket by application of the cover plate expands the gasket radially outwards towards the frame, thus accomplishing a seal in more than one direction. This embodiment will be readily understood when observing FIG. 1 and the corresponding description.

In one or more embodiments the frame may be formed by a part of the camera housing, preferably a cover part of the camera housing. This is a convenient way of providing the function of the frame without having to provide a separate component.

The protective window is made of polycarbonate resin, or another material being suitable for optical applications and having an elevated impact resistance. In turn, the transparent plate is made from synthetic sapphire, having excellent optical properties and a heat conductivity being larger than many other materials having similar optical qualities. Still, other materials may be used for the transparent plate as well.

Turning to the heating arrangement, it may be embodied by a flexible printed circuit or a rubber heating band, powered by a power supply of the monitoring camera. Both examples offer rugged and straightforward alternatives for providing the desired heating effect.

The resilient profile may, in any embodiment, be formed in one piece from a resilient material, or in multiple parts where the desired resilience is provided by a resilient part, such as a resilient material or a spring, while a part locating the transparent plate is made from a less resilient material. There are several synthetic rubber materials or elastomers that may be used for the purpose of providing the resilient profile, yet the exact properties may be dependent on the other components of the compound window, and the desired performance of the monitoring camera in terms of impact resistance. In the described embodiments the resilient profile may be made from silicone rubber.

DETAILED DESCRIPTION OF EMBODIMENTS

Figure 1:
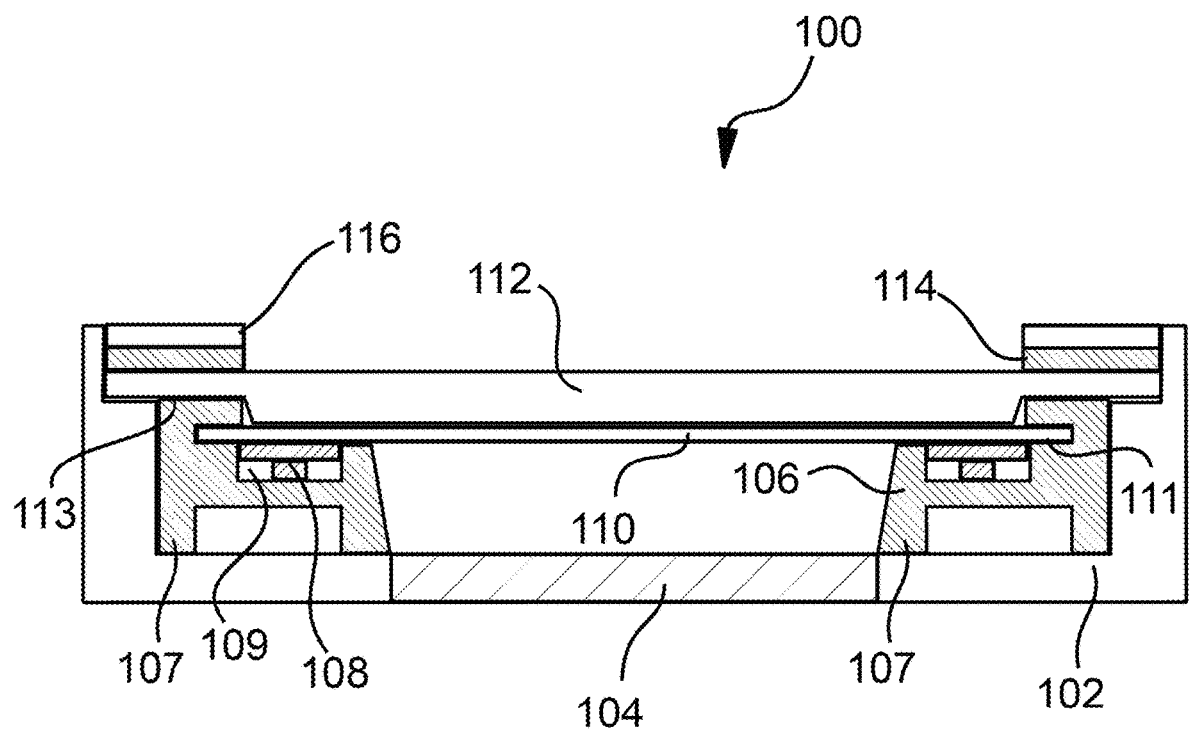
FIG. 1 is a schematic sectional view of a compound window which may be used in a first embodiment.
Figure 2:
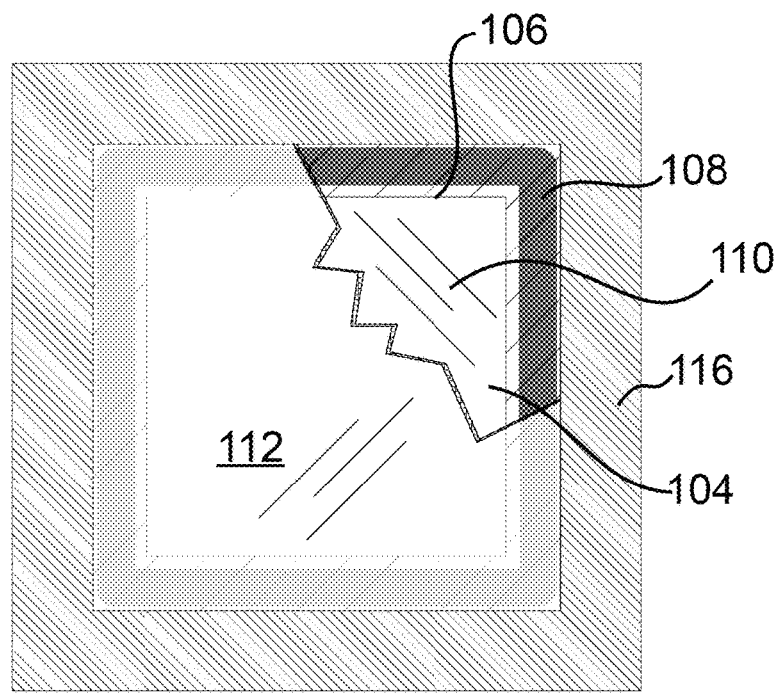
FIG. 2 is a schematic plan view of the window assembly of FIG. 1.
Figure 3:
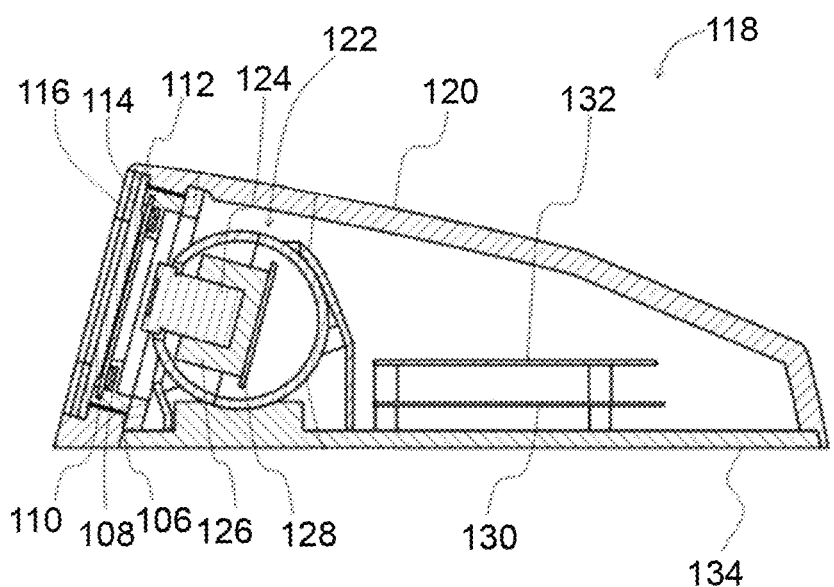
FIG. 3 is a sectional view of a monitoring camera according to another embodiment.
Figure 4:
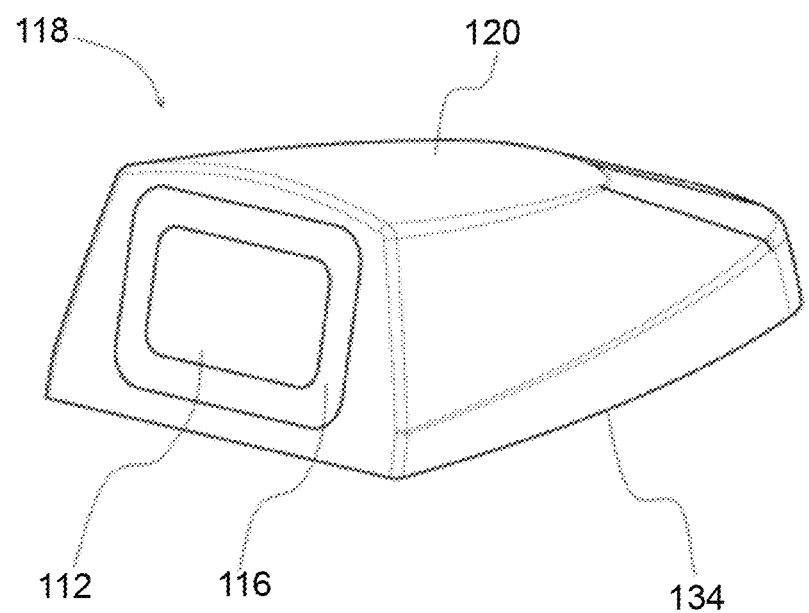
FIG. 4 is a perspective view of the monitoring camera of FIG. 3.

FIG. 1 is a schematic sectional view of a compound window 100 according to a first embodiment. The components of the compound window 100 are represented with the purpose of clarifying a function rather than a suggested design. In FIG. 3 a cross section of an actual camera assembly comprising the compound window of a further embodiment, providing a closer representation of an actual application.

The compound window 100 of FIG. 1 has a frame 102 defining a central opening 104 through which light for imaging may pass. The frame 102 is shown as a separate defined component, yet in a monitoring camera the frame 102 may form an integral part of a protective housing.

A resilient profile 106 sits in the frame. The resilient profile may be made from rubber, or any suitable polymer material. In other embodiments the resilient profile is formed from two pieces, wherein the resilience is provided by springs, such as coil springs. As will be evident from the description the resilient profile of the present embodiment will serve multiple purposes. In other embodiments each or some purposes may be provided by separate components or portions of a compound construction, and given the description of the present resilient profile, such constructions are readily generated by a person skilled in the art. In any embodiment the resilient profile may have an area of reduced structural stability 107 (e.g. the "legs" on which it contacts the profile in FIG. 1) between the transparent plate and the frame. This results in that while the rest of the resilient profile may be maintained essentially unchanged, meaning that the resilient properties may be provided while having a structural integrity in areas where other components, such as the transparent plate or the protective window, are mounted. In other embodiments, not shown, the resilient profile may be formed without the radially inner legs, closest to the central opening 104, so as to offer a solution where the transparent plate is displaced with even greater ease.

A heating arrangement 108 is positioned in a recess 109 of the resilient profile 106, and a transparent plate 110 is arranged on top of the heating arrangement 108 and held in place by a flange/recess 111 of the resilient profile 106. The transparent plate should be formed from a material having an adequate transmittance for wavelengths that should be allowed to propagate to an image sensor of the camera on which the compound window is arranged. This typically would correspond to visible light and near-infrared radiation, which obviously could vary with application. Also, for the purposes herein, the transparent plate should have a high thermal conductivity. An example of a suitable material would be (synthetic) sapphire glass (Corundum or $Al_2O_3$).

A protective window 112 is arranged on top of and in close proximity to the transparent plate 110. The protective window 112 also rests on the frame 102 and an upper surface 113 of the resilient profile 106. The protective window 112 will essentially have the same requirements as the transparent plate 110, yet instead of the thermal conductivity, the protective window should have an elevated impact resistance. An example of a suitable material could be polycarbonate resin.

A gasket 114 and a cover plate 116 are arranged on top of the protective window 112, which makes it possible to ensure integrity of the window assembly 100. The gasket 114 will provide a seal between the protective window 112 and the cover plate 116, and it will preferably expand outwards during compression so as to provide a seal towards the frame 102 as well, and thereby allowing for the compound window to provide a sealing function as well as a protective sealing.

FIG. 3 is a cross sectional view of a monitoring camera assembly 118 having the compound window according to another embodiment. The main difference between the embodiment of FIG. 3 is that the function of the frame 102 is provided by a camera housing 120, as was mentioned as a possibility before. For the sake of simplicity, the same reference numbers will be used for like components. Further components of FIG. 3 that have not been described in relation to the previous drawings is a movable (pan and tilt) camera head 122, including a lens assembly 124 arranged in a lens holder 126 and with an associated sensor PCB 128, comprising an image sensor for acquiring an image. The assembly further comprises a control PCB 130, and a power supply indicated at 132. The function of the monitoring camera may be the same as any existing monitoring camera, and since that is not part of the teachings it will not be discussed in any greater detail within the context of the present description. Further, the monitoring camera housing comprises a cover part 120, in which the compound window is arranged, and a base plate 134 onto which the camera head and the electronics may arranged. Other camera constructions may be applied without departing from the gist of the present invention.

Returning now to the function of the compound window, when in use. The first aspect is the heating of the protective window, e.g. with the purpose of removing ice or dew that has ended up on it. Adequate impact protection is a common requirement for monitoring cameras arranged in public areas, and it is difficult to find a material that is both impact resistance and has a high enough thermal conductivity. Materials having high enough thermal conductivity often are more brittle, and therefore they lack the required impact resistance. "High enough" should be construed as high enough to allow for heat from a heating source arranged on one portion of a window to spread over the surface of the window sufficiently quickly and completely. Obviously, it is unwanted to arrange heating elements so that they obstruct the view, so typically they would be arranged along the perimeter of the window. Also, the materials referred to should be suitable for optical components, otherwise the task of finding a suitable material would be trivial. There is also an issue in that excessive heating (any heat increase, basically, but the more the worse) of the image sensor will be detrimental to the noise level in the acquired image.

The solution according to the teachings herein is presented in the illustrated embodiments. Instead of adding a heating element to the protective window 112, which would be inefficient, the heating arrangement 108 is arranged in close proximity, preferably in direct contact with, the peripheral edge areas of the transparent plate 110 so as not the obstruct the transmittance of the transparent plate 110. The heating arrangement 108 may for example be a flexible printed circuit (an FPC) or a rubber heater, which is electrically connected to the control PCB. When heat is applied, the heating arrangement will thus heat the peripheral edge areas of the transparent plate, and due to the properties of the transparent plate the heat will spread efficiently over the surface of the transparent plate 110. In this way the thermal energy will be distributed and in close proximity to the protective window 112, and it will be readily transferred from the transparent plate 110 to the protective window 112 over the entire area of the protective window 112. Thereby a first effect is achieved.

A second effect relates to the impact resistance of the compound window. As mentioned, the transparent plate tends to be brittle, and therefore it should not be subject to impact violence. If there is an impact onto the protective window 112 it will, instead of being directly transferred to the transparent window 110, result in that a lower part of the resilient profile 106 will collapse—resiliently—inwards, and thereby the transparent window 110 will be displaced away from the protective window, and thereby it will survive the impact unharmed. The protective window will therefore determine the impact resistance of the product, and polycarbonate is very suitable for this purpose. The distance between the transparent plate and the protective window is basically as short as possible. There may even be direct contact, though it is not preferred due to the risk of image artefacts. Therefore, as the protective window is forced downwards it will not be prone to contact the transparent window with a sharp edge, under an angle. Rather, there will be a contact surface, and that contact surface may increase further as the resilient profile gives away. All in all, the compound window may withstand a significant impact without breaking, and even if the transparent plate may be brittle compared to the protective window, the durability of the compound window may be the limiting factor for the durability of the compound window.

The invention claimed is:

1. A monitoring camera having a compound window arranged in a frame of a camera housing, and a camera head arranged inside the housing, wherein the compound window has an inner transparent plate, closest to the camera head, and an outer protective window, arranged in a plane parallel to the transparent plate, on an outside thereof, wherein the compound window further comprises a heating arrangement arranged and configured to supply thermal energy to peripheral areas of the transparent plate, wherein the transparent plate has a greater heat conductivity than the protective window and is arranged in close proximity to the protective window, so that thermal energy transferred from the heating arrangement to the transparent plate may be efficiently transferred to the protective window.

2. The monitoring camera of claim 1, wherein the transparent plate is arranged in a resilient profile, which in turn is arranged in the frame, and wherein a resilience of the resilient profile enables for it to move in relation to the frame, thus providing the same function for the transparent plate.

3. The monitoring camera of claim 2, wherein also the protective window is arranged in or on the resilient profile, so that a displacement of the protective window is transformed to a biasing force on the resilient profile.

4. The monitoring camera of claim 2, wherein the resilient profile has an area of reduced structural stability located between the transparent plate and the frame, so that any deformation resulting in relative motion between the frame and the resilient profile is focused to this area, enabling for the transparent plate to be forced downwards towards the frame, in the direction of the camera head, without breaking.

5. The monitoring camera of claim 2, wherein the heating arrangement is arranged in a recess of the resilient profile, preferably on the far side thereof in relation to the protective window.

6. The monitoring camera of claim 1, wherein a gasket is arranged onto the protective window and held in place by a cover plate.

7. The monitoring camera of claim 6, wherein the gasket is arranged in the frame, so that compression of the gasket by application of the cover plate expands the gasket radially outwards towards the frame, thus accomplishing a seal.

8. The monitoring camera of claim 1, wherein the frame is formed by a part of the camera housing, preferably a cover part of the camera housing.

9. The monitoring camera of claim 1, wherein the protective window is made of polycarbonate resin.

10. The monitoring camera of claim 1, wherein the transparent plate is made from synthetic sapphire.

11. The monitoring camera of claim 1, wherein the heating arrangement is a flexible printed circuit or a rubber heating band, powered by a power supply of the monitoring camera.

12. The monitoring camera of claim 2, wherein the resilient profile is formed in one piece from a resilient material.

13. The monitoring camera of claim 2, wherein the resilient profile is formed in multiple parts where the desired resilience is provided by a resilient part, such as a resilient material or a spring, while a part locating the transparent plate is made from a less resilient material.

* * * * *